United States Patent [19]

Tohzuka et al.

[11] Patent Number: 5,132,446

[45] Date of Patent: Jul. 21, 1992

[54] FLUORINE-CONTAINING PHOSPHATE ESTER, ITS PREPARATION AND ITS USE FOR PREVENTING RUST

[75] Inventors: Takashi Tohzuka; Yoshiaki Kataoka; Sueyoshi Ishikawa, all of Osaka, Japan

[73] Assignee: Daikin Industries, Ltd., Osaka, Japan

[21] Appl. No.: 603,006

[22] Filed: Oct. 25, 1990

Related U.S. Application Data

[63] Continuation-in-part of Ser. No. 340,218, Apr. 19, 1989, abandoned.

[30] Foreign Application Priority Data

Apr. 19, 1988 [JP] Japan ................................. 63-97683

[51] Int. Cl.$^5$ ........................ C07F 9/09; C23F 11/167
[52] U.S. Cl. .................................. 558/186; 558/188; 252/389.2; 252/389.23
[58] Field of Search ........................ 558/186, 188

[56] References Cited

U.S. PATENT DOCUMENTS 3,293,306 12/1966 LeBleu et al. .................. 558/186
4,724,092 2/1988 Fukui et al. ..................... 568/684
4,836,944 6/1989 Tohzuka et al. ................. 252/54

FOREIGN PATENT DOCUMENTS 0015592 9/1980 European Pat. Off. .
2515374 12/1975 Fed. Rep. of Germany .

*Primary Examiner*—Mukund J. Shah
*Assistant Examiner*—E. Bernhardt
*Attorney, Agent, or Firm*—Birch, Stewart, Kolasch & Birch

[57] ABSTRACT

A fluorine-containing phosphate ester of the formula:

$$(R_fCH_2O)_n P(OH)_{3-n} \quad (I)$$
$$\|$$
$$O$$

wherein $R_f$ is a group containing a perfluoroalkyl polyether group of the formula:

$$F(CF_2CF_2CF_2O)_m CF_2CF_2-$$

wherein m is 2 to 200, and n is an integer of 1 to 3 is used as a rust preventive which can be homogeneously mixed with a fluorine-containing grease.

2 Claims, No Drawings

FLUORINE-CONTAINING PHOSPHATE ESTER, ITS PREPARATION AND ITS USE FOR PREVENTING RUST

CROSS-REFERENCE TO RELATED APPLICATION

The present application is a continuation-in-part application of application Ser. No. 07/340,218 filed on Apr. 19, 1989, now abandoned.

BACKGROUND OF THE INVENTION

1. Field of the Invention

The present invention relates to a novel fluorine-containing phosphate ester, its preparation and its use for preventing rust of, for example, a bearing.

2. Description of the Related Art

Since a fluorine-containing grease has properties of insulation and non-flammability, it can be used in various applications. Inorganic powder such as sodium nitrate or magnesium oxide is used as a rust preventive or a stabilizer for the fluorine-containing grease. However, the inorganic powder is not easily available in the form of a fine powder and is hardly homogeneously mixed with the fluorine-containing grease. When the inorganic powder, is mixed with a fluorine-containing grease and used for preventing the rusting of a bearing, a large sound is created when the bearing is used.

SUMMARY OF THE INVENTION

An object of the present invention is to provide a fluorine-containing phosphate ester which is easily available, which can be homogeneously mixed with a fluorine-containing grease, which can be used as a rust preventive when the mixture is used to grease a bearing and does not create a large sound when the bearing is used.

These and other objects are achieved by a fluorine-containing phosphate ester of the formula:

   (I)

wherein $R_f$ is a group containing a perfluoroalkyl polyether group of the formula:

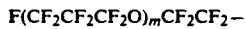

in which m is 2 to 200, and n is an integer of 1 to 3, which comprises 0 to 50% by weight of a mono-ester, 50 to 90% by weight of a di-ester and 0 to 50% by weight of a tri-ester. Preferably, the lower limit of the mono- or di-ester is 2% by weight, more preferably 5% by weight, in particular 10% by weight.

In a preferred embodiment, the ester of the present invention comprises 10 to 20% by weight of the mono-ester, 60 to 80% by weight of the di-ester and 10 to 20% by weight of the tri-ester.

DETAILED DESCRIPTION OF THE INVENTION

In the fluorine-containing phosphate ester (I), the $R_f$ group is a group of the formula:

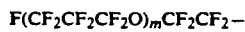

wherein m is 2 to 200, preferably from 15 to 200 on the average.

In the formula (I), n is preferably 1 or 2.

Specific examples of fluorine-containing phosphate ester (I) are

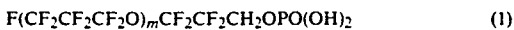   (1)

wherein m is 2 to 200, preferably 25 on the average, and

   (2)

wherein m is 2 to 200, preferably 25 on the average.

The fluorine-containing phosphate ester (I) can be prepared by reacting a fluorine-containing alcohol of the formula:

   (II)

wherein $R_f$ is the same as described above, with a phosphoryl compound and then with water.

The phosphoryl compound is, for example, phosphoryl trichloride or phosphoric acid. A mixture of phosphoryl trichloride and phosphoric acid is preferably used. The mixture of phosphoryl trichloride and phosphoric acid preferably contains phosphoryl trichloride and phosphoric acid in a molar ratio of 2:1 to 6:1. The fluorine-containing alcohol may be reacted with the phosphoryl compound at a temperature of 60° to 120° C. for 2 to 6 hours.

Hydrolysis is carried out through the reaction with water. Water may be used in an amount of not less than 10 moles per mole of the phosphoryl compound. The hydrolysis may be carried out at a temperature of from 80° to 100° C. for 1 to 5 hours.

In the method of the present invention, when the phosphoric acid component is used in a smaller amount, a larger amount of the tri-ester is produced, and when the phosphoric acid component is used in a larger amount, a larger amount of the mono-ester is produced.

The molar ratio of the mono-, di- and tri-ester also varies according to the molar ratio of the phosphoryl trichloride component and $R_fCH_2OH$. When the molar ratio of phosphoryl trichloride/$R_fCH_2OH$ is about 1:2, a larger amount of the di-ester is produced. Therefore, by varying the molar ratios of phosphoryl trichloride/phosphoric acid or phosphoryl trichloride/$R_fCH_2OH$, the molar ratio of the mono-, di- and tri-ester is capable of being adjusted.

The rust preventive comprising fluorine-containing phosphate ester (I) in which n is one or two is particularly preferable. The rust preventive according to the present invention can be advantageously used as the rust preventive which is added to the fluorine-containing grease, although it may be used as the thermally resistant rust preventive in applications other than as an addition to the fluorine-containing grease. The rust preventive according to the present invention is easily available and can be homogeneously mixed with the fluorine-containing grease. Even if it is mixed with the fluorine-containing grease and used for greasing a bearing, it only creates a small sound when the bearing is used.

Examples of the fluorine-containing grease are disclosed in U.S. Pat. No. 4,724,092, the disclosure of which is hereby incorporated by reference, and corresponding Japanese Patent Publication No. 45715/1974.

The fluorine-containing phosphate ester (I) has good mold release and can also be used as a releasing agent. It is suitably used as an extreme-pressure additive.

PREFERRED EMBODIMENTS OF THE INVENTION

The present invention is illustrated by following Examples.

EXAMPLE 1

In a 500 ml four-neck flask, an 85% aqueous solution of phosphoric acid (1.3 g) and phosphoryl trichloride (7.0 g) were charged and the fluorine-containing alcohol:

$$F(CF_2CF_2CF_2O)_pCF_2CF_2CH_2OH$$

wherein p is 25 on the average (500 g) was dropwise added while stirring. This fluorine-containing alcohol was prepared according to the same method as Example 1 of U.S. Pat. No. 4,836,944, the disclosure of which is hereby incorporated by reference, except that the number of the repeating units on the average was changed from 20 to 25. After the reaction was carried out at 90° C. for three hours, a resultant hydrogen chloride gas was removed for three hours under a reduced pressure. Then, water (100 g) having the temperature of 90° to 95° C. was added and the hydrolysis was carried out at 95° C. for one hour while stirring. After the reaction mixture was cooled to a room temperature, it was extracted from trichlorotrifluoroethane (Daiflon S-3 manufactured by Daikin Industries Ltd.,) (1 kg). Washing with water was repeated until the pH of a trichlorotrifluoroethane phase was adjusted to not smaller than about 4. Then, trichlorotrifluoroethane was evaporated under a reduced pressure. A residue was filtrated through a filter having a pore diameter of 0.2 μm to obtain the fluorine-containing phosphate ester:

$$[F(CF_2CF_2CF_2O)_pCF_2CF_2CH_2O]_qPO(OH)_{3-q} \quad (A)$$

wherein p is 25 on the average and q is 1, 2 and 3 in the molar ratio of 10/70/20. Yield: 450 g (90%).

The molar ratio of the mono- (q=1), di- (q=2) and tri-ester (q=3) was calculated from the 31P-NMR analysis.

EXAMPLE 2

To a perfluoropolyether oil (Demnum S-65 manufactured by Daikin Industries Ltd.) (10 g), the fluorine-containing phosphate ester (0.3 g) prepared in Example 1 was added and then trichlorotrifluoroethane (10 g) was added to prepare a homogeneous solution. An iron test piece was dipped in the solution, and then removed from the solution and air dried. A rust prevention test was carried out by using a 100 ml polyethylene wide-mouth container which contained a 1% aqueous solution of salt (30 ml). The test piece was placed in the container such that a portion of the test piece was in the aqueous solution and the other portion of the test piece was out of the aqueous solution. Then the container was capped and left at a room temperature for 24 hours. The test piece had no rust.

COMPARATIVE EXAMPLE 1

A solution was prepared and the rust prevention test was carried out in the same manner as in Example 2 but the fluorine-containing phosphate ester was not used. The test piece had a significant amount of rust.

EXAMPLE 3

A fluorine-containing grease (Demnum Grease L-65 manufactured by Daikin Industried Ltd.) (20 g) was homogeneously mixed with the fluorine-containing phosphate ester prepared in Example 1 (0.6 g) to prepare a mixture grease. Then the corrosion test was carried out. According to ASTM 1743-73, the mixture grease was coated on a conical roller bearing and the bearing was dipped in a 0.1% aqueous salt solution of salt for 60 seconds. Then, the bearing was left at room temperature under a relative humidity of 100% for 48 hours. The bearing had no corrosion.

COMPARATIVE EXAMPLE 2

The corrosion test was carried out in the same manner as in Example 3 but the fluorine-containing phosphate ester was not used. Some corroded portions were observed.

EXAMPLE 4

A fluorine-containing grease (Demnum Grease L-65 manufactured by Daikin Industries Ltd.) (10 g), the fluorine-containing phosphate ester prepared in Example 1 (0.3 g) and trichlorotrifluoroethane (10 g) were homogeneously mixed. Then the test was carried out in the same manner as in Example 2. The test piece had no rust.

EXAMPLE 5

The fluorine-containing phosphate ester prepared in Example 1 (66 g) and a low-molecular weight polytetrafluoroethylene (Daikin-polyflon TFE low polymers L-5 manufactured by Daikin Industries Ltd.) were mixed in a grinding machine to prepare a grease having the consistency of 285. The test was carried out in the same manner as in Example 3. No corrosion was observed.

COMPARATIVE EXAMPLE 3

The fluorine-containing compound:

$$[F(\overset{\underset{|}{CF_3}}{C}FCF_2O)_n\overset{\underset{|}{CF_3}}{C}F_2CF_2CH_2O]_qPO(OH)_{3-q} \quad (B)$$

wherein n is 16 on the average and q is 1, 2 and 3 in the molar ratio of 10/70/20, was prepared in the same manner as in Example 1 but using, as the fluorine-containing alcohol, the compound:

$$F(\overset{\underset{|}{CF_3}}{C}FCF_2O)_n\overset{\underset{|}{CF_3}}{C}FCH_2OH$$

wherein n is 16 on the average prepared from the compound:

$$F(\overset{\underset{|}{CF_3}}{C}FCF_2O)_n\overset{\underset{|}{CF_3}}{C}FCOF$$

wherein n is 16 on the average.

Evaporation losses of the fluorine-containing phosphate ester (A) and the fluorine-containing phosphate ester (B) were measured at 250° C. The phosphate ester (20 g) was charged in a glass cylindrical container (inner diameter: 85 mm, height: 17 mm) and the container was placed in a circulating hot air oven heated at 250° C. After 3 hours, a loss of weight was measured.

|  | Dynamic viscosity at 40° C. (cst) | Evaporation loss at 250° C. (% by weight) |
|---|---|---|
| Ester (A) | 162 | 2.3 |
| Ester (B) | 167 | 14.1 |

The evaporation loss is advantageously small so as to use the ester as a thermally resistant rust preventive. From the above results, it is understood that the fluorine-containing phosphate ester (A) according to the present invention has a smaller evaporation loss and better than the fluorine-containing phosphate ester (B) although both have approximately the same viscosity.

What is claimed is:

1. A fluorine-containing phosphate ester of the formula:

$$(R_fCH_2O)_n\underset{\underset{O}{\|}}{P}(OH)_{3-n} \qquad (I)$$

wherein $R_f$ is a group containing a perfluoroalkyl polyether group of the formula:

$$F(CF_2CF_2CR_2O)_mCF_2CF_2-$$

in which m is 2 to 200,
and n is an integer of 1 to 3, which comprises 0 to 50% by weight of a mono-ester, 50 to 0% by weight of a di-ester and 0 to 50% by weight of a tri-ester.

2. The fluorine-containing phosphate ester according to claim 1, which comprises 10 to 20% by weight of the mono-ester, 60 to 80% by weight of the di-ester and 10 to 20% by weight of the tri-ester.

* * * * *